United States Patent [19]

Chapman et al.

[11] 4,204,085
[45] May 20, 1980

[54] SEISMIC-PROOF BUS DUCT JOINT

[75] Inventors: Frank X. Chapman, Perkasie, Pa.; Charles R. Gallant, Beach Haven Park, N.J.; Charles V. Stull, Ambler, Pa.

[73] Assignee: Gould Inc., Rolling Meadows, Ill.

[21] Appl. No.: 910,079

[22] Filed: May 26, 1978

[51] Int. Cl.² .................. H02G 5/08; H02G 3/06
[52] U.S. Cl. .................................. 174/86; 174/13; 174/21 CA; 174/88 B; 174/99 E; 339/9 E
[58] Field of Search .............. 174/88 B, 86, 13, 99E, 174/21 CA; 339/9 E

[56] References Cited
U.S. PATENT DOCUMENTS

| 2,977,404 | 3/1961 | Swerdlow | 174/99 E |
|---|---|---|---|
| 3,004,096 | 10/1961 | Rowe | 174/88 B |
| 3,035,112 | 5/1962 | Wilson | 174/99 E |
| 3,077,512 | 2/1963 | Frostick | 174/99 E |
| 3,786,170 | 1/1974 | Floessel | 174/13 |

Primary Examiner—Roy N. Envall, Jr.

Attorney, Agent, or Firm—Ostrolenk, Faber, Gerb & Soffen

[57] ABSTRACT

A bus duct joint for joining two bus ducts consists of a sheet metal enclosure having openings at each end for receiving the respective ends of bus ducts having internal bus which is to be joined together. The interior of the joint member contains flexible conductors for electrically connecting the corresponding bus bars of the two bus ducts so that the bus bars can have a given movement with respect to one another without undue strain on the bus supports. Each of the flexible conductors is covered by flexible insulation material bus joint covers. A sealing rubber sheet surrounds a window through which at least one of the bus ducts enters the sheet metal joint member so that there can be misalignment between the duct and the joint member. An annular metal shield surrounds the end of the bus duct which engages the sealing rubber sheet to prevent water from contacting the conductors if the rubber seal becomes ineffective and to prevent objects from slipping between the metal seal and the bus duct and into the interior of the joint.

11 Claims, 7 Drawing Figures

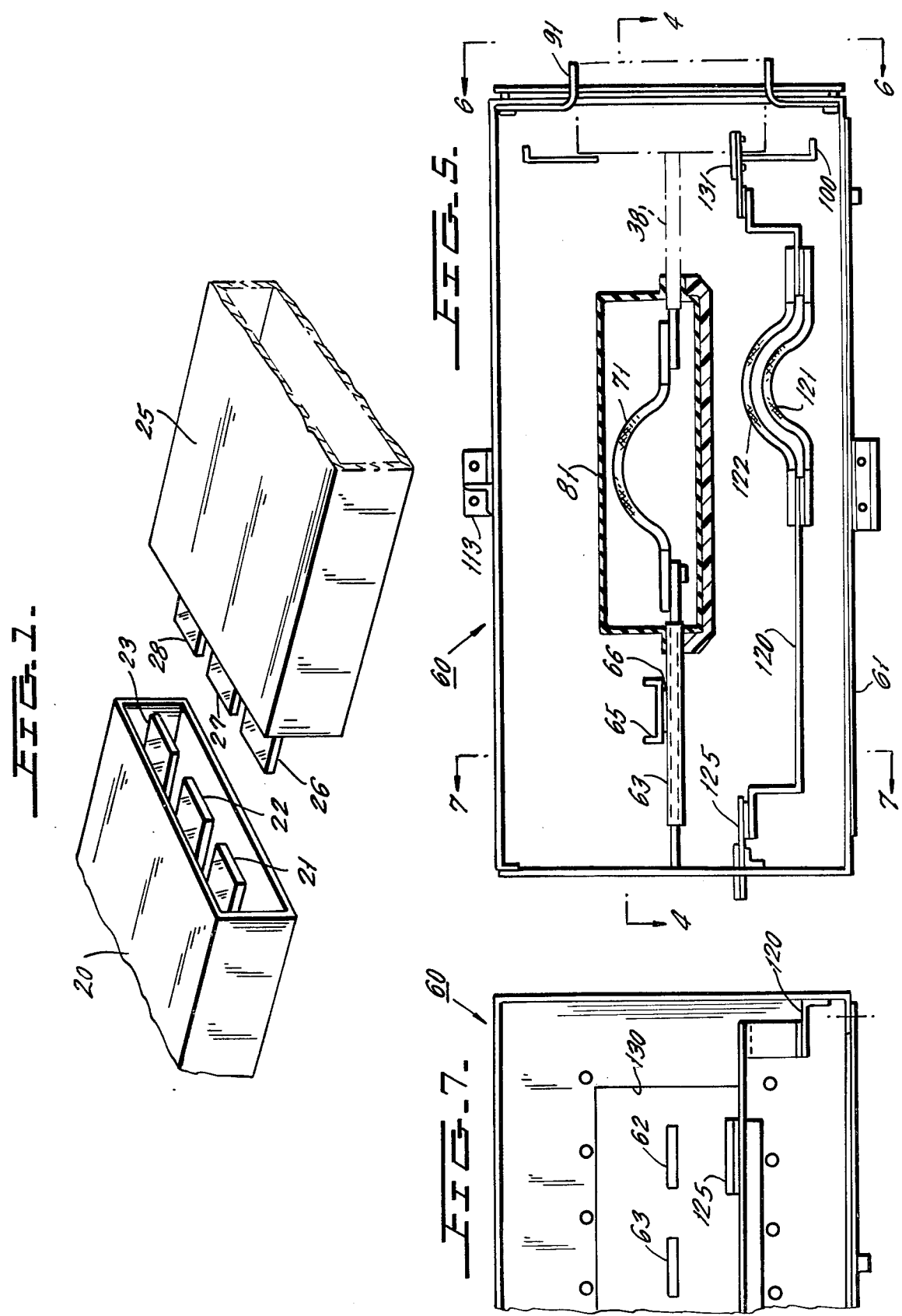

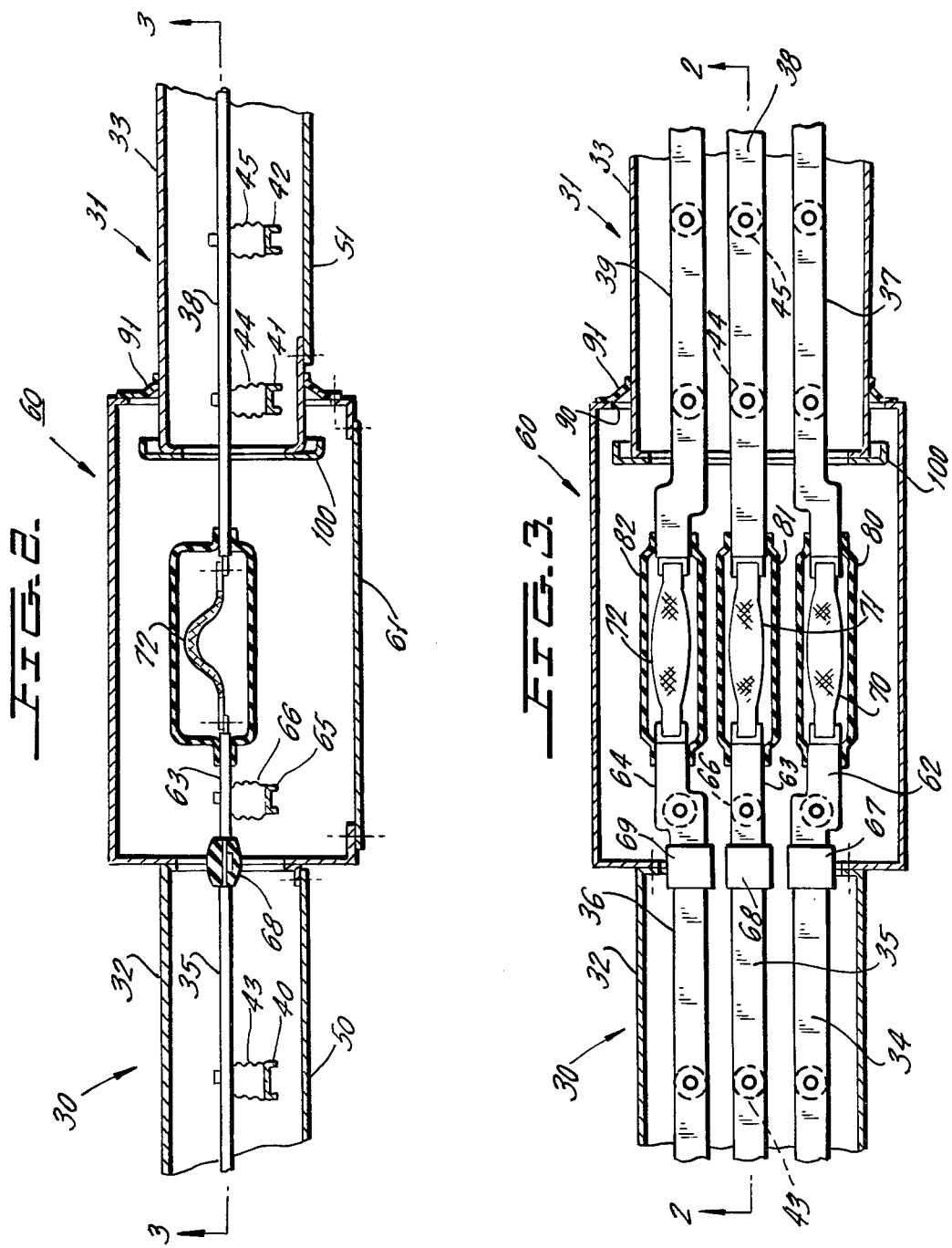

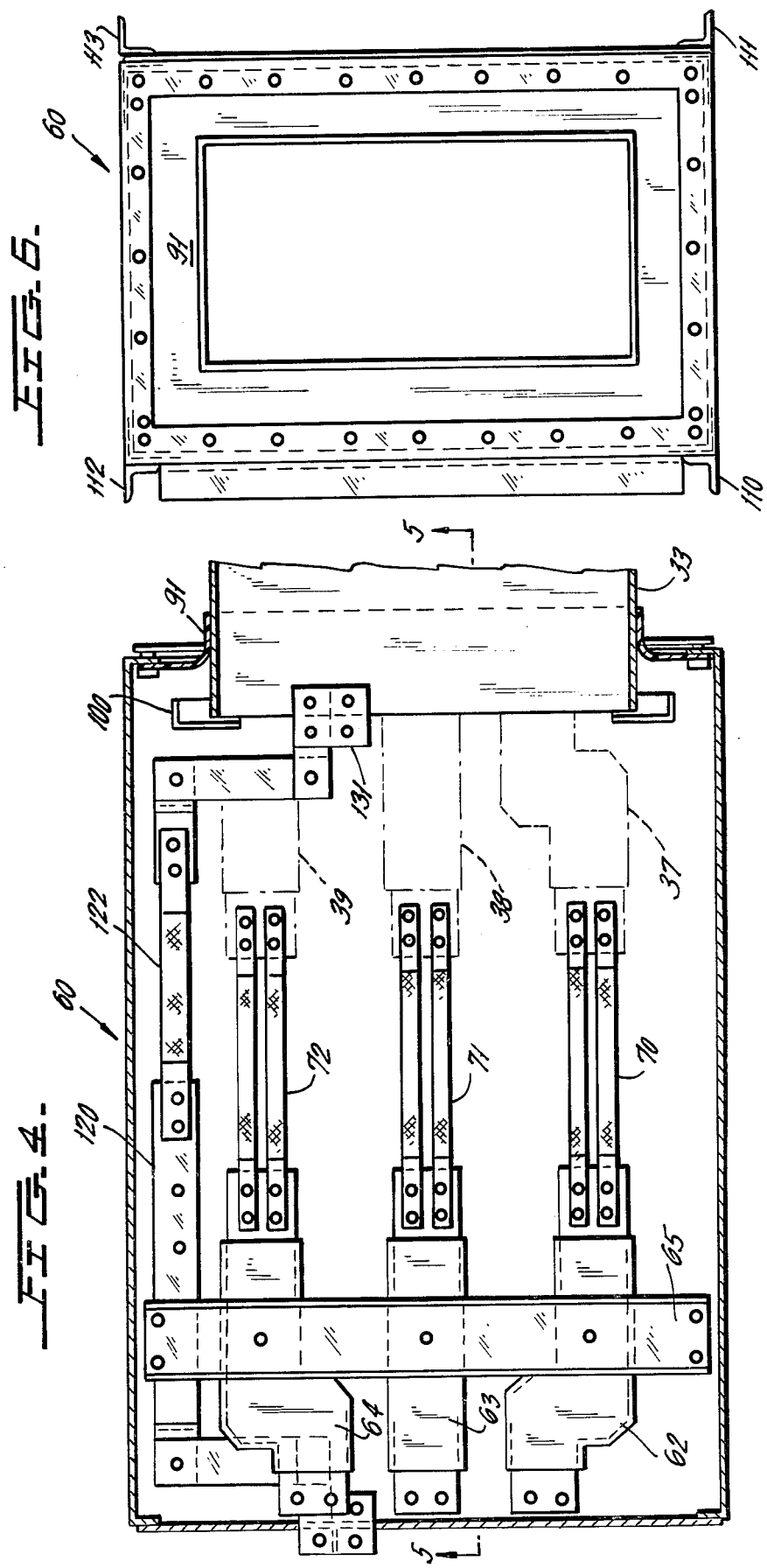

SEISMIC-PROOF BUS DUCT JOINT

BACKGROUND OF THE INVENTION

This application relates to electrical bus duct assemblies and more specifically relates to a novel joint for the connection of two separated bus ducts to one another in a manner which permits relative movement between the ends of the two bus ducts due to a seismic event or the like while maintaining electrical continuity between the ducts.

Bus duct is well known for electrical connection between generators and transformers, between transformers and switchgear assemblies, and to interconnect switchgear assemblies. This bus duct will frequently traverse buildings from floor to floor and from wall to wall on the same floor and therefore are subject to misalignment in any of three orthagonal directions due to a seismic event or other effects causing a relative shift in the duct support structure. Consequently, bus duct should normally contain a suitable joint along its length which permits a given amount of misalignment in the bus duct run.

In order to permit misalignement along the length of a bus run, it is known to provide an elongated corrugated rubber bellows enclosing the volume between the spaced ends of two bus duct units. These corrugated rubber bellows are expensive because of their size and contour and are commonly manufactured with a round cross-sectional shape. Because of the round cross-sectional shape, the bus duct enclosures must be rounded at their ends thus adding material costs and space requirements to the bus duct arrangement.

BRIEF DESCRIPTION OF THE PRESENT INVENTION

In accordance with the present invention, a novel bus duct joint is provided which can be inserted at any point along the length of a bus duct run and which consists of a simple sheet metal enclosure which receives the opposite ends of the bus duct sections and which permits substantial misalignment between these ends of the bus elements and housings of the spaced bus duct assemblies. The sheet metal enclosure has a rubber sealing sheet extending around its periphery. The sheet has a rectangular cutout for receiving the rectangular bus enclosure of the conventional bus duct assembly. The bus conductors of the separated bus duct assemblies are then joined in the center of the sheet metal enclosure or joint by a flexible conductor which will permit substantial misalignment between the ends of the bus while maintaining electrical continuity. Each of the flexible conductors is enclosed by a suitable flexible insulation sheath. The end of the bus duct housing which enters the sheet metal enclosure has an enlarged perimeter shroud or shield thereon which prevents one from reaching his hand through the sealing rubber sheet and into the enclosure. This shroud also prevents water or moisture from seeping into the enclosure and reaching the bus conductor elements.

BRIEF DESCRIPTION OF THE DRAWINGS

FIG. 1 shows in perspective view two bus duct members which are to be joined together and which are to have the ability to move certain distances relative to one another in the event of a seismic event.

FIG. 2 is a cross-sectional view of the novel bus duct joint of the present invention when connected between two separate standard bus duct units.

FIG. 3 is a cross-sectional view of FIG. 2 taken across the section line 3—3 in FIG. 2.

FIG. 4 is an enlarged cross-sectional view of one embodiment of the bus duct joint of the present invention which is generally schematically illustrated in FIGS. 2 and 3.

FIG. 5 is a side cross-sectional view of FIG. 4 taken across the section line 5—5 in FIG. 4.

FIG. 6 is an end view of FIG. 5 as seen from the section line 6—6 in FIG. 5.

FIG. 7 is a cross-sectional view of FIG. 5 taken across the section line 7—7 in FIG. 5.

DETAILED DESCRIPTION OF THE DRAWINGS

Referring first to FIG. 1, there is shown therein a standard bus duct unit which consists of a sheet metal rectangular housing 20 having therein three bus conductors 21, 22 and 23 which are appropriately supported within duct 20 and which may be the conductors of a three-phase electrical system. A second bus duct unit 25 is provided which may be constructed identically to duct 20 and indeed may be an interrupted section of the same duct run which forms duct 20. The duct 25 contains conductors 26, 27 and 28 which are to be electrically connected to the duct 21, 22 and 23, respectively. Similarly, the housings 20 and 25 should be electrically connected together.

It is frequently necessary to allow for misalignment between the bus duct unit 20 and the bus duct unit 25 to allow for settlement of buidlings, seismic events and the like. Typically the misalignment must be permitted in any three orthagonal directions of the magnitudes indicated in FIG. 1 of 1.07 inches in a lateral direction; 2.03 inches in a vertical direction; and 1.27 inches in an axial direction.

In the past the individual buses 21 through 23 and 26 through 28, respectively, were flexibly connected to one another but the duct housings 20 and 25 were connected together and made dust-proof by a large circular corrugated rubber bellows. The circular shape of the bellows required that the sheet metal ends of the ducts housing 20 and 25 be made circular so that a seal could be made to the housings. The assembly was, therefore, expensive because of the extruded rubber bellows, the need to enlarge the ends of the duct housings, and the added space needed to accept the large diameter bellows.

The novel seismic-proof bus duct joint of the invention is schematically illustrated in FIGS. 2 and 3 where the bellows consists of a rectangular sheet metal case of inexpensive configuration.

FIGS. 2 and 3 first illustrate two standard bus duct units 30 and 31, respectively, which each consists of sheet metal rectangular enclosures 32 and 33, respectively, which each receive three bus conductors 34, 35, 36 and 37, 38 and 39, respectively. The bus duct units are non-segregated phase bus employed, for example, as metal-clad switchgear. The invention also applies to other arrangements. Bus conductors 34 to 39 are preferably covered with insulation sheaths which are stripped at the point where connection is made to other conductor components. Horizontal support beams such as the horizontal support beam 40 in unit 30 and the beams 41 and 42 in the unit 31 as shown in FIG. 2 are suitably secured to the opposite ends of the sheet metal housings 32 and 33 and carry appropriate insulators shown schematically in FIG. 2 as insulator 43 on support 40 and insulators 44 and 45 on supports 41 and 43, respectively. These insulators appropriately support each of the buses 34 to 39.

In order to permit maintenance and inspection of the bus duct units 30 and 31, they may have removable bottom panels 50 and 51 as schematically illustrated in FIG. 2.

In accordance with the invention, a novel sheet metal enclosure joint 60 is provided to permit connection between the bus ducts units 30 and 31 in such a manner that the ends of the bus duct units may move relative to one another as schematically illustrated in FIG. 1 for the bus duct units 20 and 25. Enclosure 60 is made of an enlarged sheet metal rectangle having a removable bottom cover 61 (FIG. 2).

Three conductors 62, 63 and 64 are fixed within the enclosure 60 and are mounted on a suitable metal bracket 65 which carries insulators such as the insulator 66 which supports the bus section 63. Similar insulators support bus sections 62 and 64. Note that each of conductors 62, 63 and 64 may have insulation sheaths thereon. The end of the insulation sheaths of conductors 62, 63 and 64, at each end of the bus section, is stripped. At the right-hand end of the bus, they are connected to respective braided flexible conductors 70, 71 and 72, respectively, as by clamping or bolting. Each of the braided conductors 70, 71 and 72 is formed in a loop as best seen for the conductor 71 in FIG. 2 to permit substantial misalignment in any of three orthogonal directions as well as in a rotational direction about the axis of the bus units 30 and 31 without applying a strain to the bus conductors 62, 63 or 64.

The opposite end of each of the braided conductors 70, 71 and 72 is directly connected to the inwardly extending ends of buses 37, 38 and 39 coming from the bus duct unit 31. Note that the ends of buses 37 and 39 are outwardly displaced as best shown in FIG. 3. A suitable bolted connection, or any other desired connection, is made between the buses 37, 38 and 39 and the braided conductors 70, 71 and 72, respectively.

Each of the braided conductors is encased in a flexible insulation sheath, such as the flexible polyvinyl chloride insulation sheaths 80, 81 and 82 for braided conductors 70, 71 and 72, respectively. The sheaths 80, 81 and 82 may be fitted over the joint in any desired manner to prevent inadvertent contact with any exposed conductor of any of the buses 80, 81 and 82.

The left-hand end of enclosure 60 is then solidly connected to the right-hand end of the housing 32 of the bus unit 30. The enclosure 33 of bus duct unit 31, however, simply enters into the right-hand end of enclosure 60 as illustrated through a relatively large opening 90 in the right-hand end of the enclosure. The periphery of opening 90 is encircled by a flexible sealing rubber sheet 91 which is fixed to the right-hand end of enclosure 60. Sheet 91 has a rectangular cutout for receiving the rectangular housing 33.

Since the rubber sheet 91 is flexible, the housing 33 may be displaced relative to enclosure 60 by a relatively wide margin without applying strain to the housing 60.

The end of the housing 33 is then fitted with a sheet metal pan 100 which is a sheet metal ring-shaped member which prevents personnel from forcing their hand or other objects into the enclosure 60 by deforming the rubber sheet seal 91. The metal pan 100 further serves as a moisture barrier which prevents rain or other moisture from entering the enclosure 60, as through a deformed seal 91, and forces all moisture to flow downwardly to the bottom of the enclosure 60.

It is to be noted that the rubber sheet 91 could be replaced by other sealing members which permit relative movement between the external periphery of rectangular housing 33 and the end of enclosure 60.

The adjoining ends of bus sections 62, 63 and 64 are then bolted or otherwise connected to the ends of buses 34, 35 and 36, and the connection therebetween may then be covered by a flexible protective sheath such as the sheaths 67, 68 and 69, respectively, shown in FIG. 3.

The novel enclosure 60 of FIGS. 2 and 3 is shown in more detail in the enlarged views of FIGS. 4, 5, 6 and 7. In FIGS. 4, 5, 6 and 7, components identical to those of FIGS. 2 and 3 have been given similar indentifying numerals.

In FIG. 4 the insulation sheaths 80, 81 and 82 of FIG. 3 have been removed to illustrate that the braided connectors 70, 71 and 72 each consist of two parallel conductors.

FIG. 6 better illustrates the rectangular configuration of the opening in the rubber sheet 91 which receives the rectangular housing 33 of FIGS. 2 and 3. FIG. 6 also illustrates the placement of support angles 110 and 111 and 112 and 113 and the side mounting angle 114 for mounting the enclosure 60.

FIGS. 4, 5 and 7 further illustrate the provision of a system ground bus 120 which is fixed within the enclosure 60 and is provided with a braided flexible conductor section 121–122 (FIG. 5). Note that bus 120 is supported from the left-hand end of the enclosure at bracket 125. Note further that the left-hand end of enclosure 60, as shown best in FIG. 7, has an opening 130 for receiving the buses 34, 35 and 36 of the bus duct unit 30. The opposite end of bus 120 will be appropriately secured to the right-hand end of enclosure 60 as by connection at the bracket 131 shown in FIGS. 4 and 5.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A bus duct joint for connecting the adjacent ends of first and second bus duct units in a manner which allows a given displacement of said ends of said bus duct units relative to one another; each of said bus duct units including at least one elongated bus bar supported within and insulated from an elongated sheet metal housing which is rectangular in cross-section; said bus duct joint comprising a sheet metal housing which is rectangular in cross-section and which has first and second ends; said first and second ends each having enlarged openings; said housing of said first bus duct unit being fixed to said first end of said housing of said joint with its interior communicating through said opening in said first end with the interior of said bus duct joint housing; said housing of said second bus duct unit passing through said enlarged opening in said second end of said joint housing and partially into the interior of said joint housing; said second enlarged opening being spaced from the outer surface of said housing of said second bus duct unit by given dimensions, thereby to permit lateral movement of said second bus duct housing relative to said joint housing;

flexible conductor means disposed within said joint housing for connecting each of said at least one elongated bus bar of said first and second bus duct units to one another; and sealing means extending across the space between said outer surface of second bus duct unit housing and said joint housing for covering said opening regardless of the relative position of said last-mentioned housings.

2. The bus duct joint of claim 1 wherein said first and second bus duct units have identical housings.

3. The bus duct unit of claim 2 wherein said bus duct units are displaceable relative to one another in three orthogonal directions and on a rotational axis.

4. The bus duct joint of claim 3 wherein the axis of said first and second bus duct units and the axis of said rectangular joint housing are arranged in line with one another.

5. The bus duct joint of claim 3 wherein each of said first and second bus duct units has three spaced elongated bus members therein which are disposed in a common plane and three flexible conductors within said joint housing for connecting said three conductors of said first bus duct unit to said three conductors of said second bus duct unit, respectively.

6. The bus duct joint of claim 1 or 3 wherein said sealing means comprises a thin flexible sheet of material having a rectangular opening therein receiving said housing of said second bus duct unit and having an outer periphery fixed around said enlarged opening in said second end of said joint housing.

7. The bus duct joint of claim 6 which further includes an annular ring fixed to the outer periphery of the end of said housing of said second bus duct unit to interrupt a direct line-of-sight path through said space covered by said sealing means to said bus conductors.

8. The bus duct joint of claim 3 or 5 which further includes an insulation sheath enclosing said flexible conductor means.

9. The bus duct unit of claim 1 which further includes a short bus section fixed within said joint housing and extending to said first end of said joint housing; said short end section having one end thereof connected to said bus member within said first bus duct unit, and its other end connected to said flexible conductor means.

10. The bus duct unit of claim 5 which includes three short bus conductors each fixed within said joint housing and each extending to said first end of said joint housing; one end of each of said short bus conductors connected to the end of said three bus conductors of said first bus duct unit, respectively; the other ends of said three bus conductors connected to said three flexible conductors, respectively.

11. The bus duct of claim 10 which further includes insulation sheath means for enclosing each of said flexible conductors.

* * * * *